United States Patent
Ackley et al.

(10) Patent No.: US 8,101,133 B2
(45) Date of Patent: Jan. 24, 2012

(54) RADIAL FLOW REACTOR

(75) Inventors: Mark William Ackley, East Aurora, NY (US); Cem E. Celik, Grand Island, NY (US); Jeffert John Nowobilski, Orchard Park, NY (US); James Stanley Schneider, Akron, NY (US)

(73) Assignee: Praxair Technology, Inc., Danbury, CT (US)

(*) Notice: Subject to any disclaimer, the term of this patent is extended or adjusted under 35 U.S.C. 154(b) by 189 days.

(21) Appl. No.: 12/712,694

(22) Filed: Feb. 25, 2010

(65) Prior Publication Data

US 2011/0206573 A1 Aug. 25, 2011

(51) Int. Cl.
*B01J 8/02* (2006.01)
*B01J 35/02* (2006.01)
*B01J 19/00* (2006.01)
*B65B 1/04* (2006.01)
*B65B 3/04* (2006.01)
*B01D 59/26* (2006.01)
*B01D 53/02* (2006.01)

(52) U.S. Cl. ....... 422/218; 422/129; 422/211; 422/240; 141/1; 141/285; 141/286; 95/90; 95/96; 96/121; 96/131; 96/149

(58) Field of Classification Search ............... 422/129, 422/211, 218, 219, 240; 141/1, 285, 286; 95/90, 96, 121, 131, 149
See application file for complete search history.

(56) References Cited

U.S. PATENT DOCUMENTS

| 4,541,851 | A |   | 9/1985  | Bosquain et al.       |
|-----------|---|---|---------|-----------------------|
| 5,372,792 | A | * | 12/1994 | Mueller et al. ... 422/218 |
| 5,759,242 | A |   | 6/1998  | Smolarek et al.       |
| 5,814,129 | A |   | 9/1998  | Tentarelli            |
| 5,827,485 | A |   | 10/1998 | Libal et al.          |
| 5,882,385 | A |   | 3/1999  | Bosquain et al.       |
| 6,086,659 | A |   | 7/2000  | Tentarelli            |
| 2006/0254420 | A1 |  | 11/2006 | Monereau et al.     |

FOREIGN PATENT DOCUMENTS

| DE | 3939517 A1  | 6/1991 |
| DE | 3939518 (A1)| 6/1991 |
| DE | 19600549    | 7/1997 |
| DE | 19735389 C1 | 9/1998 |

OTHER PUBLICATIONS

Grenier et al., "Adsorption Purification for Air Separation Units", *Cryogenic Processes and Equipment*, ASME (1984), pp. 143-148.
von Gemmingen, "Designs of Adsorptive Driers in Air Separation Plants", *Reports on Science & Technology*, No. 71 (1994), pp. 8-12.

* cited by examiner

*Primary Examiner* — Walter D Griffin
*Assistant Examiner* — Natasha Young
(74) *Attorney, Agent, or Firm* — Salvatore P. Pace

(57) ABSTRACT

A radial flow reactor is disclosed for use in gas purification, separation or reaction processes and most suitably used in prepurification processes. The reactor has two concentric internal baskets which are rigidly supported at both the top and bottom ends of the reactor. The reactor has a removable section in the inner basket to accommodate rotating arms to dense load one or more layers of active materials between the concentric baskets.

31 Claims, 6 Drawing Sheets

RADIAL FLOW REACTOR

FIELD OF THE INVENTION

The present invention relates generally to the field of radial flow reactor vessels used in gas purification, separation, and reaction processes and having internal basket assembles to retain active material used to remove and/or convert one or more components in a feed stream through adsorption and/or catalytic or non-catalytic reactions. More specifically, this invention relates to a radial flow reactor having a removable section in the inner basket to enable dense loading one or more layers of active materials between two structural concentric baskets.

BACKGROUND OF THE INVENTION

The demand for higher reactor throughput continues to increase for a variety of industrial processes linked to oil and gas recovery, alternative fuel production, sustainability of the environment and process emissions. Such demands are partially driven by the ever-increasing cost of fuel and the need for various chemical feed stocks. One example is the demand for larger cryogenic air separation units (ASUs) to meet the growing needs for large quantities of oxygen and nitrogen used in various industrial process industries. ASUs require front end purification reactors (adsorption vessels) to purify the feed air stream by removing carbon dioxide, water, trace hydrocarbons and other contaminants prior to entering the ASU. Larger ASUs require larger "prepurification units", as they are commonly known; to treat the incoming feed air prior to a cryogenic distillation process. This presents a challenge to reactor designers when trying to control the size of the reactor since higher throughput of feed air demands a proportional increase in the frontal flow area provided by the vessels resulting in larger, more costly vessels.

Gas purification, separation or reaction processes using active materials such as adsorbents and/or catalysts are well known in the art and there are several reactor vessel designs in use today for these types of processes. Examples include both vertically and horizontally oriented cylindrical vessels with upward air flow through the bed of adsorbent material or reactant and/or catalytic material during purification, separation or chemical reaction. A third type of vessel, as employed herein, is oriented with a vertical central or longitudinal axis and an internal design that directs the process gas flow radially through the bed. This radial flow design consists of a pressure vessel enclosing gas permeable concentric inner and outer baskets to contain a bed of one or more layers of active material. Such radial flow designs offer the ability to increase frontal flow area by increasing the height of the vessel without substantially altering the vessel footprint (ground area requirements). Furthermore, radial flow designs offers a more efficient means of increasing flow area compared to either horizontal or axial flow reactor designs.

Radial flow reactors typically operate continuously or in cyclic mode, depending upon the gas treatment process. Many processes, such as adsorption processes, operate cyclically in either pressure swing (PSA), vacuum swing (VSA), temperature swing (TSA) mode or in combinations of these modes wherein one or more components of the feed stream are adsorbed during the adsorption step and then desorbed or otherwise flushed from the adsorbent during the regeneration step. Thermal variations accompanying these cyclical processes, such as in TSA processes, affect bed and vessel components. Internal components, depending upon their configuration as well as their manner of connection to the vessel, expand and contract when exposed to temperature variations and thus experience loads induced by these temperature changes. Such thermally induced loads create significant mechanical stresses on all elements of the internal basket assemblies, the magnitude of such induced loads increases with increasing temperature difference. Axial and radial displacement of the basket walls may also result in compression of the bed of active material and the material particles may migrate or be damaged as a result of the basket wall movement and especially when such materials are loosely packed. In the worst case, these effects can cause physical breakdown of the active material and/or mechanical failure of the basket assemblies.

Free-flowing active particulate material is typically loaded into a bed by methods such as pouring, dumping or "sock loading," creating a loosely and non-uniformly packed bed with excess voids between the particles. Beds loaded by these techniques are subject to as much as 10% or more volume reduction by the settling of the particles. Such settling is made possible by the excess void volume and is promoted by a combination of the cycling of the flow and temperature, the expansion and contraction of the baskets and normal gravitational forces. It is desirable to mitigate these effects by maximizing the packing density and at the same time minimizing excess void volume. It is thus preferred to load a vessel in a manner that results in a uniform and densely packed bed of active material(s) wherein the potential for settling is minimized or even eliminated. This method is known as "dense loading" or "dense packing" and is also referred herein as "dense load" or "dense pack." Potential benefits of dense loading include increased reactor capacity or throughput, improved yield and/or product quality and elimination of hot spots. Furthermore, automated dense loading is safer as it eliminates having operators inside the reactor during loading.

It is further desirable to load multiple discrete radial layers of different active materials simultaneously. Such loading methods are generally known for radial flow vessels utilized for PSA processes, for example see U.S. Pat. No. 5,836,362. In such processes there are no significant induced thermal loads. The internal basket structure of such prior art vessels is designed such that the inner basket is not directly attached to the upper head of the vessel. As a result, the loading method described above is facilitated wherein a rotating arm or arms may extend from the central axis of the vessel (and baskets) to the inside wall of the outer basket. The arms are free to continuously sweep the entire 360 degrees of the annular space between the baskets as the active material(s) is loaded the form the bed. Such a loading method cannot be readily applied to vessels designed for thermal cycling wherein the inner basket is affixed or otherwise connected to the top head of the vessel, i.e. the free rotation of arms about the vessel central axis is prevented by the presence of the continuously extended inner basket. Thus, the first problem to address is the desire to dense load active material into a radial flow reactor designed for thermal cycling processes wherein an inner basket is rigidly and continuously attached to the top head of the vessel.

Radial flow reactors typically require multiple layers of active materials. For example, multiple adsorbent layers are used in air prepurification processes, e.g. alumina to primarily remove the $H_2O$ and molecular sieves to primarily remove the $CO_2$, to reduce energy consumption by decreasing the maximum regeneration temperature required and/or by decreasing the amount of regeneration gas required. Additional layers of adsorbents, catalysts, or other active material may also be required when other contaminants must be removed, such as contaminants for which the primary active materials in the bed have no selectivity, capacity or reactivity.

In order to accommodate multiple layers of materials, multiple baskets have been employed. When using more than two structural baskets, both the fabrication of the vessel and the loading of active material(s) become significantly more complex and more costly. Furthermore, rigidly affixed internal baskets transfer additional stresses to the bed containing the active materials due to the induced thermal loads on these internal baskets. Thus, a second problem to address is the need to eliminate additional baskets between the inner most and outer most baskets.

Thus, there is significant motivation to improve the mechanical design of radial flow reactors to affect greater operational reliability, lower cost and increased process flexibility while still limiting the overall footprint of the reactor vessel. Further, the present reactor is designed to permit a simple and effective means for addressing the structural problems induced by thermal effects by employing only inner and outer structural baskets and by providing a means to dense-pack multiple adsorbent layers between these baskets.

The teachings of the art are varied and inconsistent with respect to the design of radial flow reactors; particularly for vessels undergoing thermal cycling. Conventional cylindrical reactor designs typically include an internal assembly of at least two concentric porous wall baskets with the active material contained in the annular space formed between these baskets. The baskets and vessel shell generally share the same longitudinal axis. When multiple layers of active material are required in such radial flow reactors, the prior art employs additional structural porous separators between the layers of active material, i.e. the use of three or more concentric baskets. There are no teachings to achieve the dense-loading of adsorbents in radial flow type reactors operating under thermal cycling having baskets continuously affixed to the top of the reactor vessel. The patent art simply teaches pouring or dumping the active material through a sock or directly though top loading ports in the vessel.

U.S. Pat. No. 4,541,851 discloses in a first embodiment a vessel having two concentric layers of adsorbent, each layer contained between two concentric cylindrical grates. Three cylindrical grates are concentric about the same longitudinal axis as that of the vessel enclosing them. The intermediate grate is axially rigid and radially flexible while the inner and outer grates are axially flexible and radially rigid. All three grates are interconnected rigidly to the vessel shell at their upper end and interconnected rigidly to a solid floating bottom plate at their lower end.

In a second embodiment a vessel is described having three concentric layers of adsorbent and four permeable grates. The inner and outer grates are rigid in both the axial and radial direction and the two intermediate grates are rigid in the axial direction and flexible in the radial direction. All four grates are interconnected rigidly to the shell at their lower ends. Two or more layers of adsorbent can be used in this configuration. In both embodiments, the vessel has openings used for the filling and emptying of the adsorbent beds. Additional details are associated with this design are described by Grenier, M., J-Y Lehman, P. Petit, "Adsorption Purification for Air Separation Units," in Cryogenic Processes and Equipment, ed. by P. J. Kerney, et al. ASME, New York (1984).

U.S. Pat. No. 5,827,485 discloses a vessel containing an annular adsorption bed which is bounded by inner and outer baskets. A single layer of adsorbent is taught which is contained between the two permeable concentric baskets, both of which are flexible in the axial direction and rigid in the radial direction. At least one of the baskets is rigidly fastened to the top end of the vessel. The inner basket is rigidly connected at its lower end to a bottom support member and further supported on a lower hemispherical cap of the shell by ribs arranged like a star. The outer basket is directly supported at its lower end by the bottom cap. Openings are present for apparently filling (and removal) of adsorbent although no discussion of the openings or the filling is found therein. Additional details are also described by U. von Gemmingen, "Designs of Adsorptive Dryers in Air Separation Plants", *Reports on Science & Technology*, 54:8-12 (1994).

U.S. Pat. No. 6,086,659 discloses a radial flow adsorption vessel that has a plurality of grates, wherein at least one of the grates is flexible in both the axial and radial directions. The grates are rigidly attached to both the top of the vessel and to a bottom plate. The bottom plate may be floating or semi-rigidly or rigidly attached to the bottom head of the vessel. One or more intermediate grates are disclosed as a means to contain various layers of adsorbents within the vessel. The vessel has fill-ports for introducing and removing adsorbent, but no discussion of the filling process can be found.

German Patent No. DE-39-39-517-A1 discloses a radial flow vessel having a single layer of adsorbent contained between two concentric permeable grates, both of which appear to be rigid in both the axial and the radial direction. The outer basket is rigidly connected to the top end of the vessel and to a floating bottom plate. The inner basket is flexibly connected to the top end of the vessel through the use of an expansion bellows or a sliding guide. The lower end of the inner basket is connected rigidly to the floating bottom plate. The entire basket assembly is thus suspended from the top end of the vessel with the outer basket carrying the weight of the assembly and the adsorbent contained therein. Ports are used to introduce and remove adsorbent.

The patent art teaches many variations within basic design configurations wherein inner, outer, and/or intermediate baskets having various flexibilities are attached to the upper portion, bottom portion, or both portions of the vessel. The teachings for multilayer beds use an additional intermediate basket for each additional layer of material or adsorbent. These intermediate baskets are structural components that experience the loads and stresses induced by thermal cycling. Not only are the is the structural design and fabrication of the basket assembly made more complex by the presence of these intermediate baskets, but it is difficult to load adsorbents and to access and maintain components within each annular space. Such designs limit the loading of adsorbents to dumping, pouring or "sock loading" through ports on the top of the vessel resulting in a loose packing of materials subject to movement and settling during operation. The presence of intermediate baskets results in smaller volume spaces for loading active materials, further increasing the voids and decreasing packing density when active materials are poured or dumped into these spaces. As a result, the use of narrow or small-depth layers is limited when relying upon loose-pack loading methods. Thus, there is no clear teaching or direction in the art for the design of a radial flow reactor to mitigate or eliminate these problems.

The present radial flow reactor is designed such that the internal basket or basket assembly containing the bed of active material is rigidly supported at both the top and bottom ends of the vessel. The basket walls are axially flexible and radially rigid to minimize thermally induced movement and to control stresses and loads, thereby mitigating axial and radial buckling of the outer and inner baskets. A removable inner sleeve near the top of the inner basket can be temporarily removed to create a small open section in the basket. Such an opening enables the use of a rotating loading arm(s)

to dense load either a single layer or simultaneously multiple layers of active material. The removable sleeve is then replaced for normal operation of the reactor. When it is desirable to separate adjacent layers of active material to prevent minor mixing of materials during loading such as when very thin layers are desirable, such separation is attained using a flexible, non-structural porous material placed at the interface between the layers.

The present invention not only enables uniform dense loading of active materials in either single or multiple layers, but also eliminates the need for additional structural baskets. The inventive radial bed reactor design permits dense loading, is more reliable to operate, and is less costly to manufacture.

BRIEF SUMMARY OF THE INVENTION

The present invention is a radial flow reactor used in gas separation processes and particularly for purification of air by adsorption and/or catalytic or non-catalytic reactions. The reactor has two concentric porous internal baskets which confine the active material, typically a free-flowing particulate solid, within the baskets and within the cylindrical shell. The baskets are rigidly supported at both the top and bottom ends of the vessel and preferably have walls that are axially flexible to minimize thermally induced stresses and loads and radially rigid to contain and support the active material. The reactor has a removable inner sleeve adjunct to the top of the inner basket that can be removed to enable the use of a dense loading technique. The dense loading technique, utilizing a rotating loading arm or arms, can be applied to load a single layer of active material or simultaneously load multiple layers of active materials between the inner and outer baskets.

According to one embodiment of the present invention, a radial bed reactor is provided comprising:
(a) a substantially cylindrical vessel shell having a vertical longitudinal axis, a upper cap and a lower cap;
(b) a bottom support plate disposed inside the shell and connected to the lower cap;
(c) a substantially cylindrical porous outer basket disposed concentrically inside the shell along the longitudinal axis and attached to the upper cap and bottom support plate; and
(d) a substantially cylindrical porous inner basket disposed concentrically inside the porous outer basket along the longitudinal axis and having a substantially solid section attached to the upper cap of the vessel, a substantially porous section attached to the bottom support plate, and a removable section attached there between.

BRIEF DESCRIPTION OF THE DRAWINGS

For a more complete understanding of the present invention, reference should be made to the following Detailed Description taken in conjunction with the accompanying drawings in which.

DETAILED DESCRIPTION OF THE INVENTION

Figure 1:
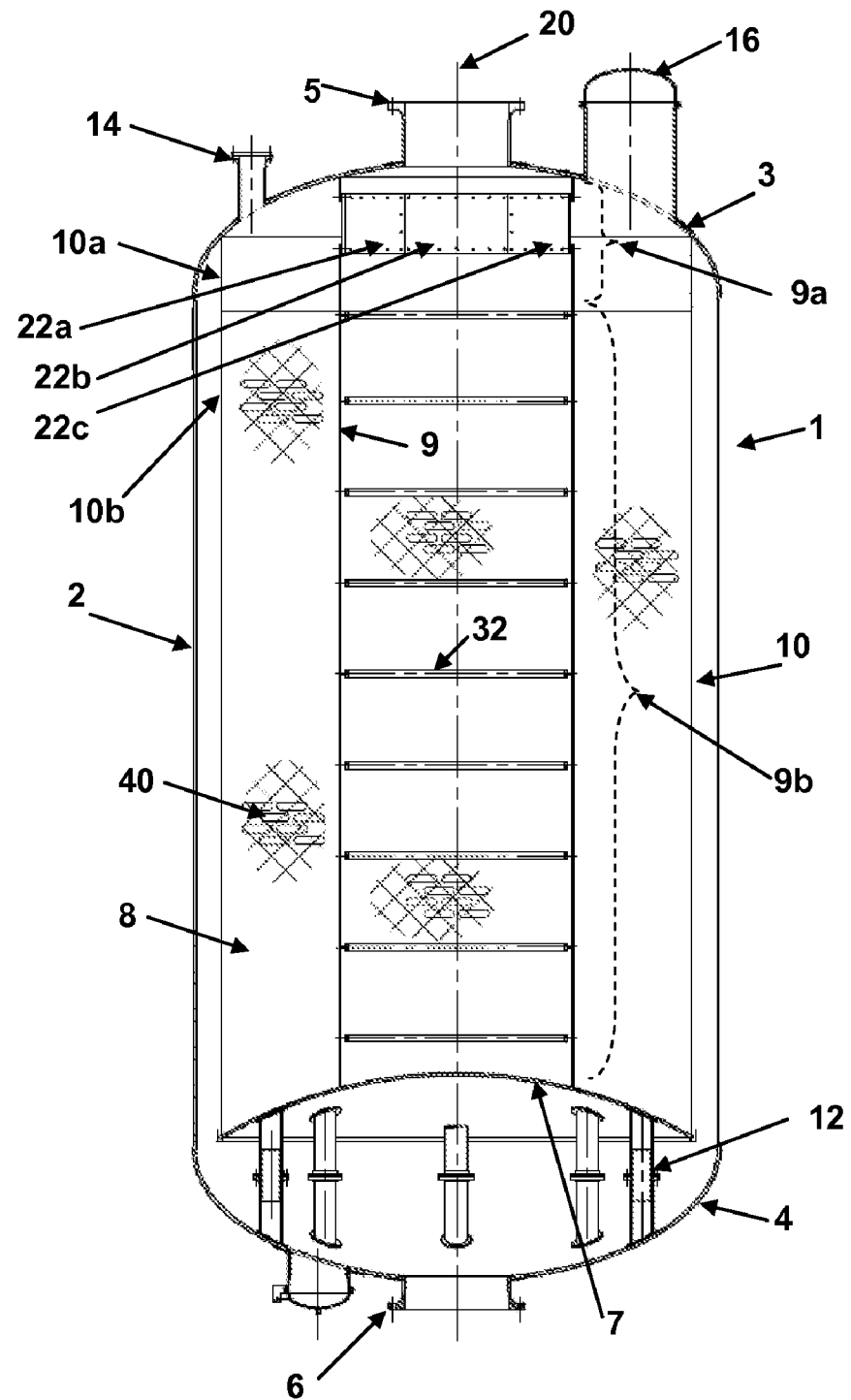
FIG. 1 is a cross sectional view of the radial flow reactor vessel of one embodiment of this invention.
Figure 2:
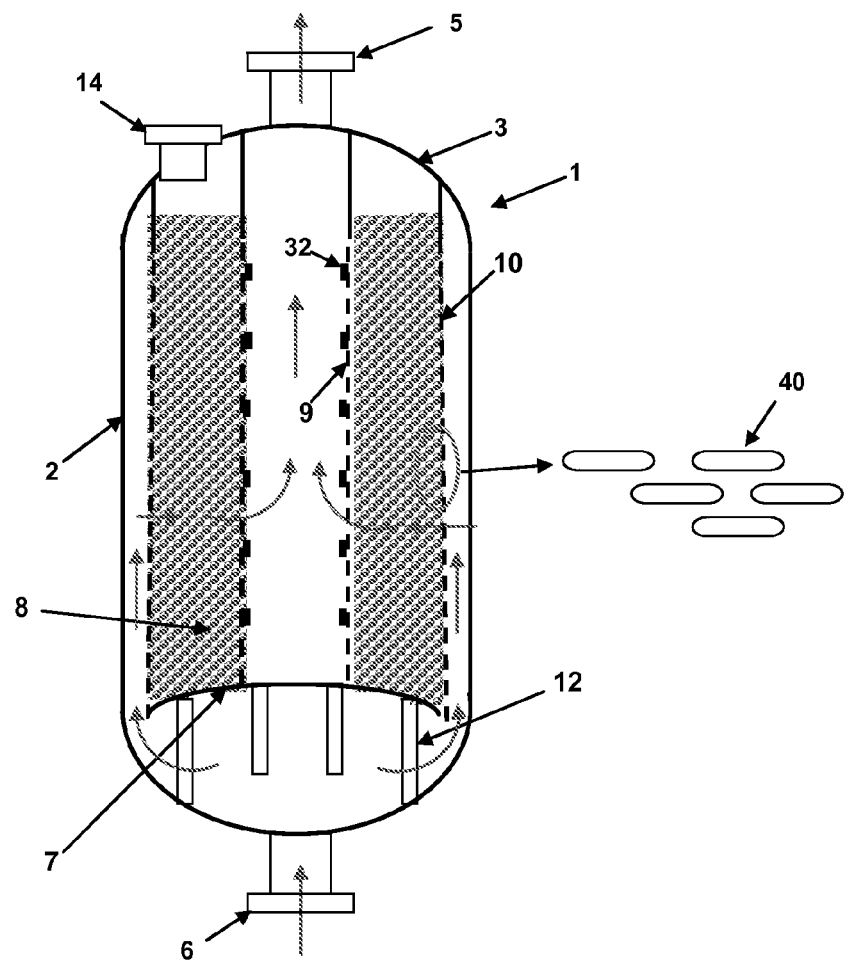
FIG. 2 is schematic of the radial flow reactor vessel of FIG. 1 showing the flow paths through the reactor.
Figure 3:
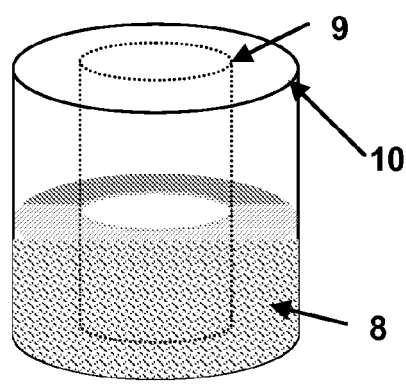
FIG. 3 is an illustration of the internal baskets and bed within the reactor vessel as shown in FIG. 1.

FIGS. 1-8 illustrate the basic structure of one embodiment of the radial flow pressure vessel of this invention and certain of its components. The cross-sectional view of FIG. 1 illustrates the essential features of this embodiment and of the invention, but does not show all fastener means, conduits and apparatus details or other aspects of the invention which are understood and readily apparent to one skilled in the art. FIG. 2 is a schematic of the vessel showing essentially the same features as in FIG. 1 and additionally the flow path through the vessel. The Figures do not represent actual dimensions.

Referring to FIG. 1, a substantially cylindrical radial flow reactor (1) on a vertical longitudinal axis (20) is shown. The vessel has an outer shell (2) with upper (3) and lower (4) hemispherical caps (or heads as generally known in the industry). Lower cap (4) has inlet (6) for receiving a feed gas and upper cap (3) has outlet (5) for the exit of the product gas in normal adsorption/reaction mode. In prepurification processes, atmospheric air would be introduced through inlet (6) and treated or purified air would exit outlet (5).

Within shell (2) is a bed (8) containing active material which is confined between two concentric cylindrical containment members, hereafter referred to as inner and outer "baskets" (9, 10). Inner basket (9) has two sections (9*a* and 9*b*) and outer basket 10 has two sections (10*a* and 10*b*) as described below. The basket arrangement is best understood by viewing FIG. 3 which illustrates the spatial relationship of inner basket (9), outer basket (10), and bed (8). The term "bed" as used herein describes both the space between the baskets (9, 10) which would contain the active material(s) and the space with active material(s) present. It is preferred to use only two baskets oriented concentrically about the same primary longitudinal axis (20) of reactor vessel (1) as shown because this simplifies the structural design of baskets (9, 10) and allows easy access to the entire annular space of bed (8) between the inner and outer baskets for loading and removal of the active material. In operation, process gas is fed in a substantially radial direction through bed (8) with respect to the longitudinal axis of symmetry of the reactor vessel.

Referring again to FIG. 1, baskets (9,10) are rigidly affixed and closed at their bottom or lower ends by bottom support plate (7), wherein the combined components (7, 9 and 10) comprise the basket assembly containing bed (8). The bottom support plate (7) is affixed to support columns (12). Support columns (12) can be unitary structures or can be split or comprised of multiple members with means to facilitate downward movement of the baskets (9, 10) to provide tension to the basket walls. Such split member support columns and a pre-stressing method employing such columns are taught in a co-pending patent application filed contemporaneously with this application. The design shown in FIG. 1 utilizes eight support columns (five shown in the cross-sectional view), although fewer or more support columns may be employed. The use of at least three support columns is preferred.

The outside of inner basket (9) and the inside of outer basket (10) represent the boundary walls of the bed (8). The walls of baskets (9, 10) are perforated and permeable over the majority of their length (typically at least 50% of the basket length) to allow flow through the bed of active material and through the reactor overall. The fraction of the basket length that is permeable is not to be confused with the percent open area of the permeable sections, e.g. open area of the perforated portions of the walls may be more or less than 50%. One skilled in the art will appreciate that these permeable sections of the baskets (9, 10) may be bounded above and/or below by solid non-permeable sections for structural purposes (for example by welding to the upper and lower caps), for defining the beginning and end of the radial flow region through the bed and for mitigating bypass of flow around the ends of the bed. The present invention introduces removable sections in the upper part of inner basket (9) to allow the dense loading of the active material(s).

Figure 6:
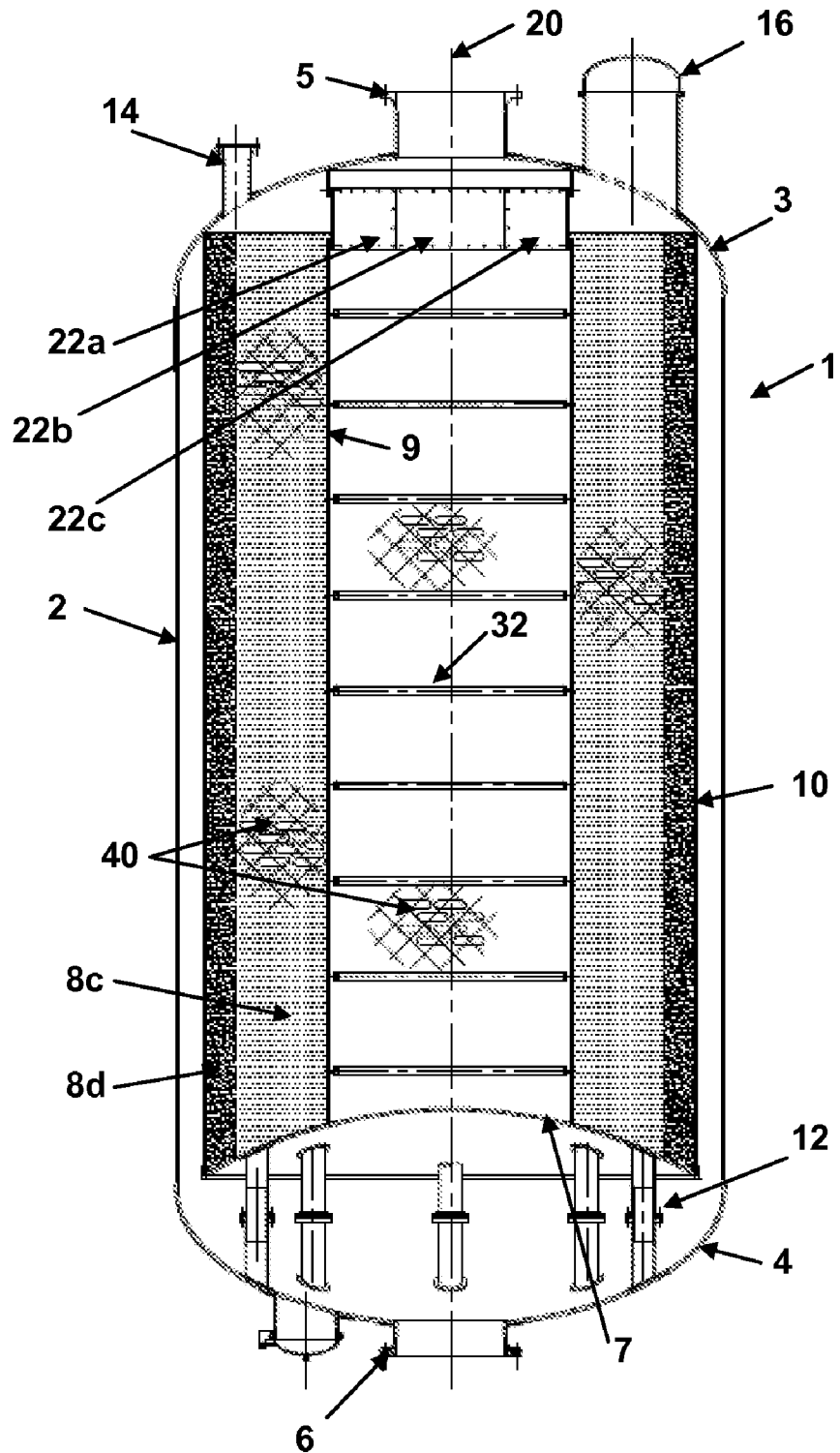
FIG. 6 is a cross sectional view of the radial flow reactor vessel of a second embodiment of this invention showing two adsorbent layers.

Inner basket (9) is comprised of substantially solid section (9a) and substantially gas permeable section (9b) to form the entire inner basket structure. The solid section (9a) of inner basket (9) is affixed to upper cap (3) of vessel (1) at its upper end and to gas permeable section (9b) of inner basket (9) at its lower end and contains a removable section (22) there between. As shown in FIG. 6 and described in more detail below, removable section (22) is comprised of three substantially rigid individual inner sleeve members (22a, 22b, 22c) that when connected to each other form a cylinder, preferably overlapping the sections of 9a above and below removable section 22 to facilitate connection thereto. While the removable section (22) is shown here as being three separate and rigid members (22a, 22b, 22c) as is preferred, more or less members can be used. Solid section (22) of inner basket (9) is removable to enable the use of rotating loading arms through the space created by its removal. Upper cap (3) has ports (14) and man way (16), as shown in FIG. 1, positioned and spaced uniformly over annular bed (8) to "top-off" the bed of active material(s) once the loading arms are removed and to permit access by maintenance personnel. Multiple ports or man ways can be employed in any suitable configuration.

Outer basket (10) is comprised of substantially solid section (10a) and substantially gas permeable section (10b) to form the entire outer basket structure as shown in FIG. 1. The solid section (10a) of outer basket (10) is affixed to upper cap (3) of vessel (1) at its upper end and to gas permeable section (10b) of outer basket (10) at its lower end.

The vertical walls of the baskets (9, 10) are perforated over a majority of their length to make them permeable to gas flow and to impart structural characteristics such that the baskets attain axial flexibility and radial rigidity to minimize movement and to control the stresses and loads that are thermally induced during operation. Permeable sections of the basket walls are preferably fabricated using perforated metal sheets, welded and rolled into cylinders. The metal is typically steel or steel alloy, selected based upon physical properties, ease of perforating, corrosion resistance, weldability and cost requirements. The thickness of the basket wall materials depends upon several structural considerations, as would be understood by one skilled in the art and the selected material and its thickness need not be the same for the inner and outer baskets. Typical basket wall thickness, however, is between 3 mm and 35 mm.

Figure 8A:
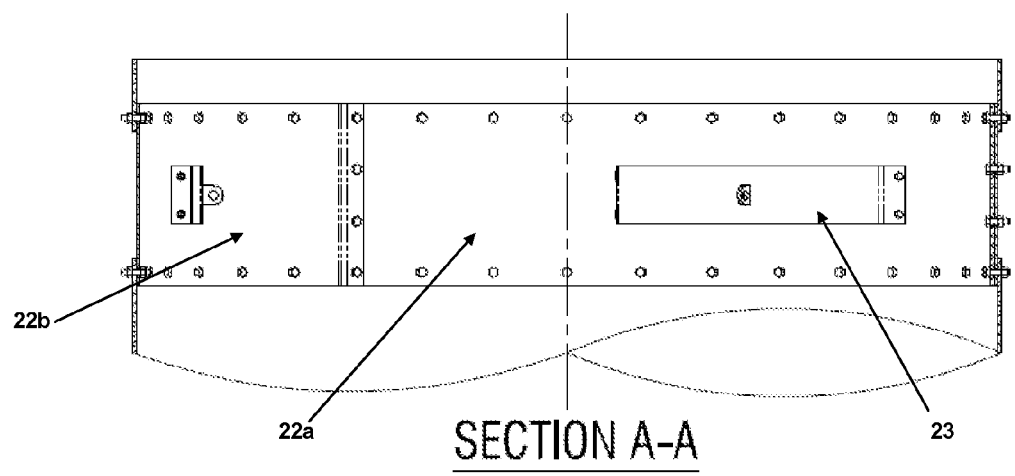
FIG. 8*a* is a cross-sectional side view of the removable inner sleeve of the inner basket and FIG. 8*b* is top view of the inner sleeve showing three interconnected inner sleeve sections.
Figure 8B:
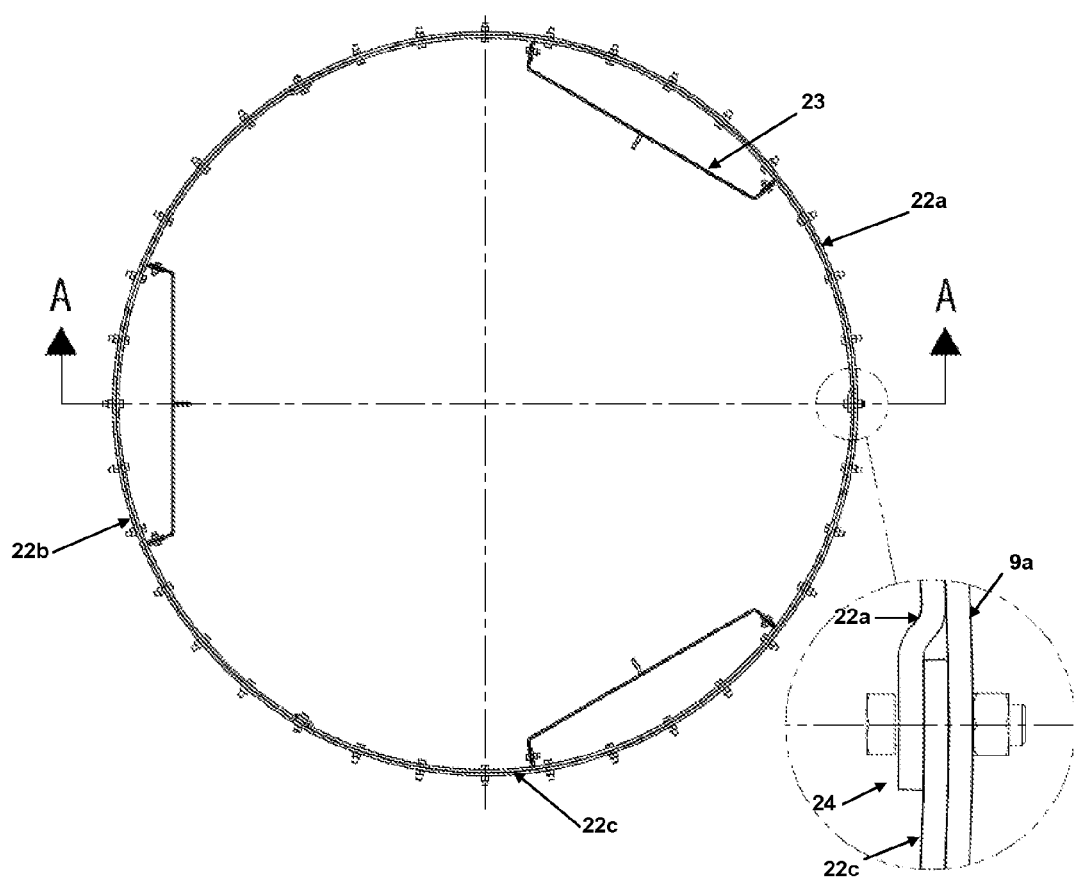

Referring now to FIGS. 8a and 8b, inner sleeve (22a) and two identical inner sleeves (22b, 22c) comprise the solid removable section (22) of the inner basket solid section (9a) and are designed to fit within the central channel within inner basket (9) between the porous section (9b) and the upper cap (3). Inner sleeves (22a, 22b, 22c) are curved so that when attached together they form a uniform, concentric cylinder that can be removably affixed to section (9a) to form an integral and structural part of inner basket (9). Each of inner sleeves (22a, 22b, 22c) has optional lifting brackets (23) and fastening means such as bolts for connection thereto. As shown in the cut-out section of FIG. 8b, each inner sleeve, here 22a, preferably has a raised lip (24) on one distal end to overlap the distal end of the mating member (22c) and to allow the mating member to snugly inter-connect to avoid voids or spaces.

As is understood by one skilled in the art, variations of this illustrated design can be used. For example, while three sleeve members are preferred, one or more members can be employed, such as a slideable one-piece member. Further, alternative connection means or configurations can be employed to fit the sleeves together and various lifting means can be used to maneuver the sleeves. Moreover, while it is preferred to have the sleeve members removably affixed to the internal face of the mating sections of the inner basket and within the central channel for ease of use, the removable sleeves can be removably affixed to the outer face of the mating sections or be integral with the inner basket outer surface with appropriate connection means without departing from the inventive concept. It is further understood that all joints between the sleeves and between the sleeves and the inner basket section (9a) shall be sealed to prevent gas leakage between the bed and the central channel of the inner basket using such sealing methods and materials as commonly known in the art, such as e.g. high temperature gaskets, sealants, etc.

Referring again the overall basket structure, one skilled in the art recognizes that while the basket walls must be gas permeable or porous (perforated) to allow fluid flow, the particular size, shape and orientation of the holes or perforations will influence the directional flexibility of the basket walls. While various perforation patterns can be employed with this invention, the perforation geometry is established to simultaneously provide; (1) sufficient open area for uniform flow permeability with low gas flow resistance, (2) allow sufficient axial flexibility and radial rigidity to maintain structural integrity under the influence of thermally induced loads and (3) maintain stability of the inner basket with the removable sections detached during dense loading of the vessel.

Figure 4:
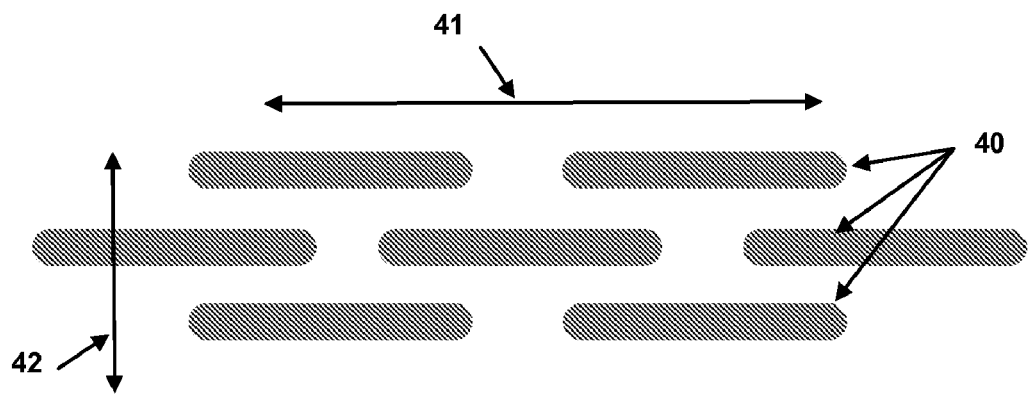
FIG. 4 is the cut out view from the basket wall shown in FIG. 2.

For example, and as best illustrated in FIGS. 2 and 4, it is known that a slotted perforation design with elongated slots (40) staggered and oriented horizontal or tangential relative to the vertical (longitudinal) vessel axis provides axial flexibility (see arrow 42) and radial rigidity (see arrow 41). Radial rigidity is achieved from the periodic continuous bands or webs of solid metal that extend around the circumference of the basket wall. Conversely, there is no uninterrupted strip or web of solid metal of the basket wall in the axial (vertical) direction due to the staggered pattern of horizontally oriented slots (40). Such a configuration is important when the inner (9) and outer (10) baskets are fixed at both the top and bottom of the vessel as in the present invention. Thus, at higher temperatures slots (40) compress to absorb the axial expansion, relieving some of the axial compressive stress that would result otherwise. However, this axial flexibility (as determined by the effective modulus of elasticity) must not be so great as to allow buckling of the basket wall due to axial compressive stresses, herein also termed "axial buckling.". While many different perforation geometries are possible, one skilled in the art knows that geometries must be selected to allow sufficient open flow area while simultaneously creating an effective modulus of elasticity of the basket material to result in the desired axial flexibility and radial rigidity. For the purpose of the present invention, the general slotted perforation configuration shown in FIG. 4 is preferred, but the specific dimensions and spacings of the slots are to be selected based upon the specific basket material and the degree of structural flexibility desired.

It has also been found through structural analysis that stiffening ribs (32) are preferably added and attached to the inner basket (9) to mitigate buckling due to external pressure applied by the active material, herein also termed "radial buckling." The stiffening ribs (32) are typically structural supports made of metal or other rigid material (preferably with the same thermal expansion characteristics as inner basket material) that are placed on the inside wall of the inner basket (9) such that each rib lies in a horizontal plane and extends continuously around the circumference of inner basket (9). The ribs (32) are spaced at regular intervals to increase the basket stiffness so as to resist the radial squeezing forces resulting from thermal cycling of the baskets and enclosed bed. The additional stiffness provided by the ribs also serves to stabilize and maintain the circular cross section of the inner basket when the inner sleeve (22) is removed.

Figure 5:
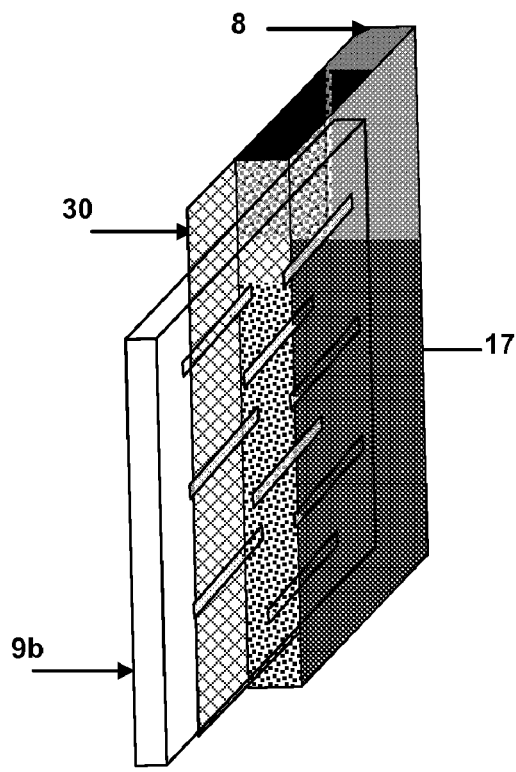
FIG. 5 is a partial illustration of one basket wall with screen and bed.

The active material may be further contained and/or divided within the bed (8) using metal or other porous and flexible materials. For example, screens can be used to line the perforated metal walls of the baskets when the perforations or slots are larger than the particle size of the active material such as illustrated in FIG. 5. FIG. 5 shows a preferred configuration wherein the wall of inner basket (9b) is made of a perforated metal sheet in contact with screen (30) in contact with bed (8) containing active material (17). Although not shown, the opposite side of bed (8) would be in contact with the inside wall of outer basket (10) which can also have a screen there between. Similar screens may also be used to separate different active materials into two or more layers within bed (8) if desired. The screens are flexible and are not intended to support significant axial loads and may be made from woven or non-woven metallic or non-metallic materials such as wire screens, fabric mesh, expanded metal mesh, open cell foam, polymeric materials and the like.

Depending upon the type of gas treatment process, the active solid material may need to be regenerated at regular intervals in a repeating cyclic manner. During this process, a regeneration gas is introduced to the vessel and flows radially through the bed of active material before exiting. The path of the regeneration flow is typically reversed relative to the path of the feed flow. For reactor vessels of the present invention, the gases always flow radially through the active material, regardless of where the feed and regeneration gases enter the vessel.

Again referring to FIG. 2, feed gas enters the bottom of the reactor (1) at inlet (6) and is directed into an outer channel formed between the shell (2) and the outside wall of outer basket (10). The feed gas then flows radially through the permeable wall section of outer basket (10), through bed (8) and the active material and exits through the permeable wall section of inner basket (9) into a central channel aligned with the vertical axis of reactor vessel (1). The product gas (or purified gas) exits the reactor vessel (1) through the outlet (5) of the vessel (1) as shown. The reactor vessel (1) can be designed to have feed gas enter either at the bottom, inlet (6), or the top, outlet (5), of the vessel such that the radial flow of the process gas through bed (8) may be either inward or outward, respectively. Cyclic processes typically direct the feed and regeneration flows countercurrent to each other, e.g. if feed flow is directed radially inward then regeneration flow would be directed radially outward.

When radial flow reactors like the present invention are utilized in conjunction with a thermal swing regeneration step, or with other thermal cyclic processes to clean or reactivate catalytic material, the internal baskets contract and expand with the decrease and increase in temperature of the gas treatment process, respectively, as described. Such thermal expansions and contractions of the baskets occur both radially and axially relative to the longitudinal axis of the reactor vessel, inducing stresses in the baskets and all internal components and fixture means. In the present invention, the baskets are constrained at the top and the bottom of the vessel. Under such constrained support, significant internal stresses will develop within the porous basket walls in response to the cyclic temperature variations.

A major advantage of affixing the internal basket assembly at both ends of the vessel is that axial movement of the baskets is essentially prevented during thermal cycling. When the baskets are supported at only one end, the unsupported end will move significantly during each thermal cycle. Such movement promotes relative motion of the active material, resulting in breakdown (attrition) and mixing at the interface of two layers of different materials. The inner basket is temporarily supported at the lower end by the bottom support plate and column supports once the inner sleeve (22) is removed for loading the active material into the vessel. After loading, the sleeve is replaced and the inner basket is again supported rigidly at both ends of the vessel.

The presence of active material generates additional radial forces on the basket walls due to thermal expansion and contraction. The bed composed of solid particles is compressed when the inner basket expands and when the outer basket contracts radially. This bed of active material particles acts as a resistance to such compression and pushes back on the basket walls. Basket materials should be selected with a low coefficient of thermal expansion. Nevertheless, radial expansion of the baskets cannot be avoided as the temperature increases.

Despite a structural design that minimizes thermal expansion and contraction and the associated induced loads and stresses upon the basket assembly and its components, the relative motion of the particles of active material is to be minimized and this is best facilitated by dense packing of the active material when first loaded into the vessel. Dense packing, as used herein, refers to the deliberate and controlled dispensing of particles of active material(s) by allowing particles to achieve sufficient velocity so that individual particles are driven into the top surface of the bed upon impact whereupon a uniform packing of the particles is achieved throughout the bed with minimal void space between the particles. Dense packing is achieved by controlling such material loading parameters as the flow rate and distribution of particles, the minimum distance between the loading distributor and the top of bed and the rotational speed of the distribution arm(s). Such dense loading methods are in contrast to typical prior art "loose pack" methods wherein the active material is dumped through a port or sock in bulk and is spread by flowing along the surface of the bed. Such loose packings are characterized by lower packing density (as much as 10% lower) and higher void fraction compared to the dense loading methods referenced in this invention.

Dense loading methods adopted within the present invention have been generally described in U.S. Pat. No. 5,836,362 for radial flow vessels utilized for PSA processes where thermal effects are absent or minimal. In such processes there are no significant induced thermal loads. The internal basket structure of such prior art vessels is designed such that the inner basket is not directly attached to the upper head of the vessel. The loading of active material is not encumbered by the presence of a solid inner basket wall extended to the top head of the vessel, but rather a rotating arm or arms may extend from the central axis of the vessel (and baskets) to the inside wall of the outer basket with no change to the structural design of the vessel. The loading arms are free to continuously sweep the entire 360 degrees circumference of space between the baskets during loading of the active material(s). Such a loading method cannot be readily applied to vessels designed for thermal cycling and with an inner basket connected to the top head of the vessel. In such a case, the free rotation of arms about the vessel central axis would be prevented by the presence of the continuous concentric inner basket and rigid connection to the upper cap (3).

There is often also a need to use different active materials, with each active material selective to one or more specific contaminants to be removed or reacted from the feed gas in order to generate the desired product of acceptable purity. In a radial flow reactor, different active materials would generally be dispersed in concentric radial layers as illustrated in FIG. 6 where layers (8*c*, 8*d*) comprise the bed. Each layer contains a different active material or mixtures of active materials required to achieve the desired separation or reaction. As discussed above, the prior art approach to meet this need for multiple layers in radial flow reactors has been to use additional structural baskets so that each material layer is contained between two adjacent concentric baskets. The present invention avoids the need to use additional structural baskets by using removable section (22) comprised of sleeve members (22*a*, 22*b*, 23*c*) of inner basket (9) and thereby allowing the use of a rotating dense loading method described above and as depicted in FIG. 7.

Figure 7:
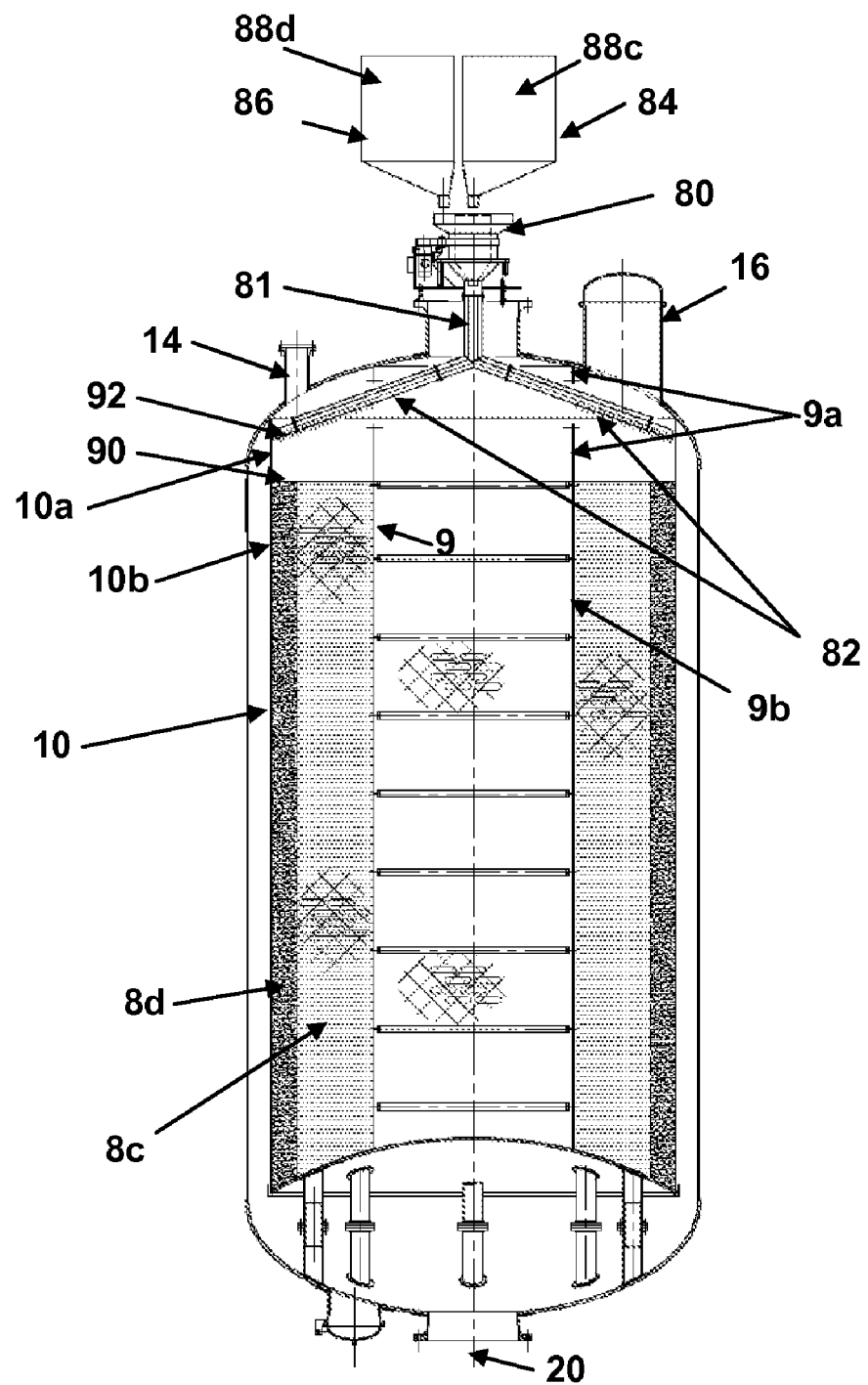
FIG. 7 is a cross sectional view of the radial flow reactor vessel of one embodiment of this invention with inner sleeve sections removed and loader and loading arms installed for dense loading multiple layers.

FIG. 7 shows the loader and other loading components in place on the top of the vessel and with the removable section (22) removed. Loading hoppers (84, 86) containing active materials (88*c*, 88*d*) feed the loader (80) which in turn directs a flow of each material into separate channels located within each of the loading arms (82). The loader (80) and loading arms (82) and other components are removed after dense loading of the active materials is completed and the removable section (22) is replaced. All sleeve members (22*a*, 22*b*, 22*c*) of removable section (22) are reconnected and sealed with a high temperature sealant to avoid any gas exchange across the inner basket in the solid (non-porous) sections of the basket.

Use of the dense loading method enables active materials of different types or sizes to be dispersed continuously, uniformly and symmetrically in radial layers with or without a physical separator. It is preferable to load such layers without any physical separator. For relatively thin radial layers and/or when little or no mixing at material interface layers is tolerable, a non-structural boundary between materials 8*c* and 8*d* can be provided in the form of a porous flexible screen. Such a screen has negligible ability to support applied radial or axial loads and serves only as a physical boundary at the layer interface. Acceptable porous separator materials may be of the woven or non-woven type, e.g. fabric, flexible wire screen, polymeric material, expanded metal screen, open cell foam, etc. Such non-structural materials must be selected with low resistance to flow and sufficient resistance to heat as generated in the process.

When a physical separator is to be used, it is formed into a cylinder and positioned at the interface between two adjacent layers of active materials. For self-supporting materials such as wire or expanded metal screens, the formed cylinder is simply attached to the bottom support plate. This cylinder (not shown) extends upward to near the top of the vessel, ending below the plane swept by the rotating loading arms. For fabric or other non self-supporting screens, the cylindrical shaped separator (also not shown) is attached to the bottom support plate and extended or stretched tightly to attach to a series of struts uniformly and angularly spaced and connected between the inner and outer baskets near the top of the vessel but below the plane swept by the rotating loading arms. The flexible screen has the advantage that it can be lowered or removed for access to the screens for maintenance if required.

The basket assembly is designed with solid basket wall sections (9*a*, 10*a*) connected to flow permeable sections (9*b*, 10*b*) of the inner and outer baskets, respectively, as shown in FIG. 1. These solid sections serve several purposes, e.g. to provide sufficient extension of the basket walls to meet and rigidly connect to the upper cap (3), as a termination to the permeable sections of the basket walls to limit radial flow through the bed to the region defined by the shell (2) of vessel located between the upper (3) and lower (4) caps, and to provide a volume above the permeable basket walls to load additional active or inert material to prevent flow bypass of the bed (8). FIG. 7 shows the bed (8) loaded up to the top end of the flow permeable sections of the baskets (9*b*, 10*b*). It is preferred to continue to dense load the active material into the volume bounded by the solid basket walls (9*a*, 10*a*) and between the top of the permeable part of bed (8) shown by arrow (90) and the tip of loading arm (82) shown as arrow (92). If this volume is not filled and remains empty as shown in FIG. 7, then a low resistance path is available for flow to bypass the active material at the top of the bed, i.e. allowing a portion of the feed stream to pass relatively untreated into the product stream.

After dense loading, the loading arms (82), down-corner (81), loader (80) and supply hoppers (84, 86) are removed and each sleeve member (22*a*, 22*b*, 22*c*) of removable section (22) is reinstalled. Depending upon the distance between the top of the permeable part of bed (90) and the tip of loading arm (92), it may be desirable to manually top-off the active material layers with additional active or inert materials through filling ports (14) and/or man way (16) shown in FIG. 6 to further increase the resistance to bypass and/or to fill void space between the dense-loaded bed and the upper cap (3). One example of such loading above the permeable sections of the baskets is shown in FIG. 6. One skilled in the art will appreciate that even more active material may be added to partially or completely fill the remaining void space up to upper cap (3). Because the active material(s) are predominantly dense loaded there will be no significant settling of these materials in the permeable regions of the baskets. This avoids the need to shut down the plant after initial cyclic operation time, opening the reactor, and adding more active materials (topping off) as is common in reactors where the active materials were not dense loaded.

While this invention is particularly suited to radial flow reactors having only an inner and outer basket and with the baskets rigidly attached to the top and bottom of the vessel, it is also applicable to any radial flow reactor with one or more inner or intermediate baskets (i.e. located inside the outer most basket) physically attached to the top of the vessel.

The invention is not limited to any particular process and may be practiced with radial flow reactors containing active materials and designed for use in cyclic and non-cyclic gas treating processes of reactive, adsorptive or separating nature. Examples of such processes are steady state ambient or elevated temperature catalytic reactions or purifications, cyclic adsorptive separations such as pressure swing adsorption (PSA), temperature swing adsorption (TSA) or combinations of these. While this invention is applicable to single and dual layers of active materials, three or more layers may be loaded using the design and methods described herein. Layers may consist of adsorbents, catalysts, reactive or inert materials or composites, mixtures or other combinations of these. A layer of inert, high density material, e.g. ceramic balls, may be installed at the either side of or intermediate to the basket assembly wherein such a layer can function as a thermal regenerator.

The solid active material may be an adsorbent, catalyst or reactant material consisting of free flowing solid particles in the form of spheres (beads), cylinders (pellets), irregular granules, etc. The active material is selected for the particular process employed and a wide range of materials are known.

For air purification or separation processes, adsorbent material is used and is typically a zeolite-type molecular sieve material as is known and commercially available. The adsorbent material used within the adsorbent bed can be composed of a single layer, or two or more layer configuration where the first layer (such as activated alumina) nearest the feed inlet removes water from the feed gas and the second layer (such as zeolite molecular sieve) adsorbs a selected gas component such as carbon dioxide in purification or nitrogen in air separation, a third layer may be used to adsorb or react one or more trace contaminants (such as CO or $N_2O$), and so on. The adsorbent or active material is preferably densely packed to minimize adsorbent settling and other particle motion and to maximize process efficiencies.

It should be apparent to those skilled in the art that the subject invention is not limited by the examples provided herein which have been provided to merely demonstrate the operability of the present invention. The scope of this invention includes equivalent embodiments, modifications, and variations that fall within the scope of the attached claims.

What is claimed is:

1. A radial bed reactor comprising:
   a) a substantially cylindrical vessel shell having a vertical longitudinal axis, a upper cap and a lower cap;
   b) a bottom support plate disposed inside the shell and connected to the lower cap;
   c) a substantially cylindrical porous outer basket disposed concentrically inside the shell along the longitudinal axis and attached to the upper cap and bottom support plate; and
   d) a substantially cylindrical porous inner basket disposed concentrically inside the porous outer basket along the longitudinal axis and having a substantially solid section attached to the upper cap of the vessel, a substantially porous section attached to the bottom support plate, and a removable section attached there between.

2. The radial bed reactor of claim 1 wherein at least one layer of active material is distributed around the longitudinal axis in the annular space formed between the inner and outer baskets.

3. The radial bed reactor of claim 1 wherein the removable section is an internal sleeve with means to be removably affixed to the inner face of the substantially solid section.

4. The radial bed reactor of claim 3 wherein the removable section forms a continuous inner basket structure when affixed to the substantially solid section.

5. The radial bed reactor of claim 3 wherein the removable section is comprised of multiple members.

6. The radial bed reactor of claim 5 wherein the removable section is comprised of 3 members.

7. The radial bed reactor of claim 5 wherein the members are connected to form a uniform, concentric cylinder within and attached to the inner basket.

8. The radial bed reactor of claim 7 wherein each member has means to inter-connect to thereby reduce space or voids between the members.

9. The radial bed reactor of claim 8 wherein each member has at one distal end a lip to overlap the distal end of the mating member.

10. The radial bed reactor of claim 1 wherein the inner and outer baskets are axially flexible and radially rigid.

11. The radial bed reactor of claim 10 wherein the walls of the baskets are made from perforated metal sheets.

12. The radial bed reactor of claim 11 wherein the perforated sheets include elongated slots that are staggered and orientated horizontal relative to the vertical vessel axis.

13. The radial bed reactor of claim 11 wherein screens are positioned between the bed and the inner basket, between the bed and the outer basket, or both.

14. The radial bed reactor of claim 1 wherein stiffening ribs are placed on the inside wall of the inner basket in a horizontal plane and extending around the circumference of the inner basket.

15. The radial bed reactor of claim 1 wherein at least three support columns are disposed between the bottom support plate and the lower cap.

16. The radial bed reactor of claim 1 wherein the support columns are comprised of two members.

17. The radial bed reactor of claim 1 wherein the porous section of the inner basket represents at least 50% of the total inner basket structure.

18. The radial bed reactor of claim 1 comprising at least two layers of active material contained between the inner basket and outer basket distributed in a continuous, uniform manner and oriented such that all of the gas to be processed passes through both layers and wherein the layers of active material are positioned such that the active material from two adjacent layers are in direct contact with each other at the interface between said adjacent layers.

19. The radial bed reactor of claim 1 comprising at least two layers of active material contained between the inner basket and outer basket distributed in a continuous, uniform manner and oriented such that all of the gas to be processed passes through both layers and wherein adjacent layers of the active material are separated by a flexible, non-load bearing screen.

20. A radial bed reactor comprising a substantially cylindrical vessel shell with a vertical longitudinal axis and having a substantially cylindrical porous outer basket disposed concentrically inside the shell along the longitudinal axis and one or more substantially cylindrical porous inner baskets concentrically inside the porous outer basket along the longitudinal axis,
   wherein the inner and outer baskets are attached to the top and bottom of the shell and form a bed for containing active material between the inner and the outer baskets, and
   wherein the one or more inner baskets include a removable section near the top of the shell that can be removed to permit a loader to densely load one or more layers of active materials into the circumference of the bed and then reinstalled prior to operation.

21. The radial bed reactor of claim 20 wherein at least two layers of active material are simultaneously loaded into the bed.

22. The radial bed reactor of claim 21 wherein adjacent layers of the active material are separated by a flexible, non-load bearing screen.

23. The radial bed reactor of claim 21 wherein the vessel shell has a port for receiving a loader.

24. The radial bed reactor of claim 20 wherein the vessel shell has a port for receiving a loader.

25. The radial bed reactor of claim 20 wherein the loader has at least one rotating arm.

26. The radial bed reactor of claim 25 wherein the loader has at least two arms and the arms can sweep the entire 360 degrees circumference of the bed.

27. The radial bed reactor of claim 20 wherein there is only one inner basket.

28. The radial bed reactor of claim 20 loaded with active material by the method comprising removing the removable section from the inner basket, dense loading one or more layers of the active materials into the circumference of the bed through the opening created by the removal of the removable section using a loader having loading arms to direct the flow of active material and then reinstalling the removable section prior to operation.

29. A method of dense loading a radial bed reactor having a substantially cylindrical vessel shell with a vertical longitudinal axis, a substantially cylindrical porous outer basket disposed concentrically inside the shell along the longitudinal axis, a substantially cylindrical porous inner basket concentrically inside the porous outer basket along the longitudinal axis;

a) with the outer and inner baskets attached to the top and bottom of the shell and form a bed for containing active material between the inner and the outer baskets; and b) wherein the inner basket includes a removable section near the top of the shell, the method comprising:
   1) removing the removable section from the inner basket; and
   2) dense loading one or more layers of active materials into the circumference of the bed through the opening created by the removal of the removable section using a loader and then reinstalling the removable section prior to operation.

30. The method of claim 29 wherein the loader directs a flow of active material into separate channels.

31. The method of claim 30 wherein the loader has at least one arm that can sweep the entire 360 degrees circumference of the bed though the opening created by the removal of the removable section.

* * * * *